(12) United States Patent
Clutterbuck

(10) Patent No.: US 6,183,082 B1
(45) Date of Patent: *Feb. 6, 2001

(54) CONTACT LENSES WITH CONSTANT PERIPHERAL GEOMETRY

(75) Inventor: Timothy A. Clutterbuck, Jacksonville, FL (US)

(73) Assignee: Johnson & Johnson Vision Care, Inc., Jacksonville, FL (US)

(*) Notice: Under 35 U.S.C. 154(b), the term of this patent shall be extended for 0 days.

This patent is subject to a terminal disclaimer.

(21) Appl. No.: 09/217,363

(22) Filed: Dec. 21, 1998

(51) Int. Cl.[7] .................... G02C 7/04; G02C 7/02
(52) U.S. Cl. ............... 351/160 R; 351/176; 351/177
(58) Field of Search .................... 351/176, 160 R, 351/160 H, 161–162, 177

(56) References Cited

U.S. PATENT DOCUMENTS

| 4,463,148 | 7/1984 | Hofer et al. ............ 526/264 |
| 5,455,641 | 10/1995 | Hahne et al. ............ 351/160 H |
| 5,532,768 | * 7/1996 | Onogi et al. ............ 351/160 R |
| 5,861,114 | * 1/1999 | Roffman et al. ............ 264/2.5 |

FOREIGN PATENT DOCUMENTS 0 646 825    4/1995   (EP).

* cited by examiner

*Primary Examiner*—Scott J. Sugarman
*Assistant Examiner*—Jordan M. Schwartz
(74) *Attorney, Agent, or Firm*—Lois Gianneschi

(57) ABSTRACT

The invention provides contact lenses. In particular, the invention relates to contact lenses in which the geometry of the lens periphery remains constant with changes in the optic zone curvature.

5 Claims, 4 Drawing Sheets

CONTACT LENSES WITH CONSTANT PERIPHERAL GEOMETRY

FIELD OF THE INVENTION

The invention relates to contact lenses. In particular, the invention relates to contact lenses in which the geometry of the lens periphery is constant.

BACKGROUND OF THE INVENTION

The use of contact lenses for the correction of visual acuity is well known. The front, or convex, surface of contact lens has an optic zone with a curvature for correction of the wearer's visual acuity. Thus, the optic zone curvature will change with changes in the wearer's prescription. This change in optic zone curvature is accompanied by changes in the lens mass and its distribution as well as the geometry of the lens area surrounding the optic zone, or the lens periphery.

The changes in optic zone and lens periphery geometry are problematic in that the changes result in variations in the fit of the lens and, thus, lens performance, as the wearer moves from one prescription to another. In the cases in which the lens prescription necessitates complex mechanical features, such as toric lenses or lenses with cylinder power, even greater variations in fit may be experienced as the lens prescription changes over time. Therefore, a need exists for a contact lens design that overcomes this disadvantage.

DETAILED DESCRIPTION OF THE INVENTION AND PREFERRED EMBODIMENTS

It is a discovery of the invention that contact lenses that have more consistent fit and performance as the wearer's prescription changes may be obtained by providing lenses with a constant peripheral geometry. By "constant peripheral geometry" is meant that, even with changes in the optic zone curvature, the peripheral zone geometry remains constant. For purposes of the invention, the peripheral zone of a lens is the area that surrounds the optic zone of a contact lens. The lenses of the invention exhibit predictability of performance and fit as compared to prior art lenses.

In one embodiment, the invention provides a method or manufacturing contact lenses comprising, consisting essentially of, and consisting of a.) providing a peripheral zone geometry for the contact lenses comprising, consisting essentially of, and consisting of a slab-off gap of about 4.50 mm, an edge thickness differential of about 0.170 mm, a slab-off central diameter of about 8.00 mm or about 9.50 mm, and a bevel width of about 1.00 to about 1.50 mm; and b.) providing subsequently two or more optic zone designs for the contact lenses, wherein the peripheral zone design remains substantially constant.

In another embodiment, the invention provides a plus toric contact lens comprising, consisting essentially of, and consisting of a convex outer surface, a concave inner surface, the convex surface having a slab-off gap of about 4.50 mm, an edge thickness differential of about 0.170 mm, a slab-off central diameter of about 8.00 mm, and a bevel width of about 1.00 to about 1.50 mm.

In yet another embodiment, the invention provides a minus toric contact lens comprising, consisting essentially of, and consisting of a convex outer surface, a concave inner surface, the convex surface having a slab-off gap of about 4.50 mm, an edge thickness differential of about 0.170 mm, a slab-off central diameter of about 9.50 mm, and a bevel width of about 1.00 to about 1.50 mm.

By "plus toric lens" is meant a contact lens with a toric, or cylinder correction, and a positive spherical power. By "minus toric lens" is meant a contact lens with cylinder correction and a negative spherical power. By "slab-off" is meant the tapered area of the lens peripheral to the central optic zone. By "slab-off gap" is meant the vertical distance between the edges of the slab-offs at their closet points to each other. By edge thickness differential" is meant the difference between the thickest portion of the lens periphery in a non-slab-off area and the thinnest part of the periphery within the slab-off area. By "slab-off central diameter" is meant the vertical distance between the center points of the innermost edges of the slab-offs. By "bevel" is meant an inclined area at the periphery of the lens.

Figure 3:
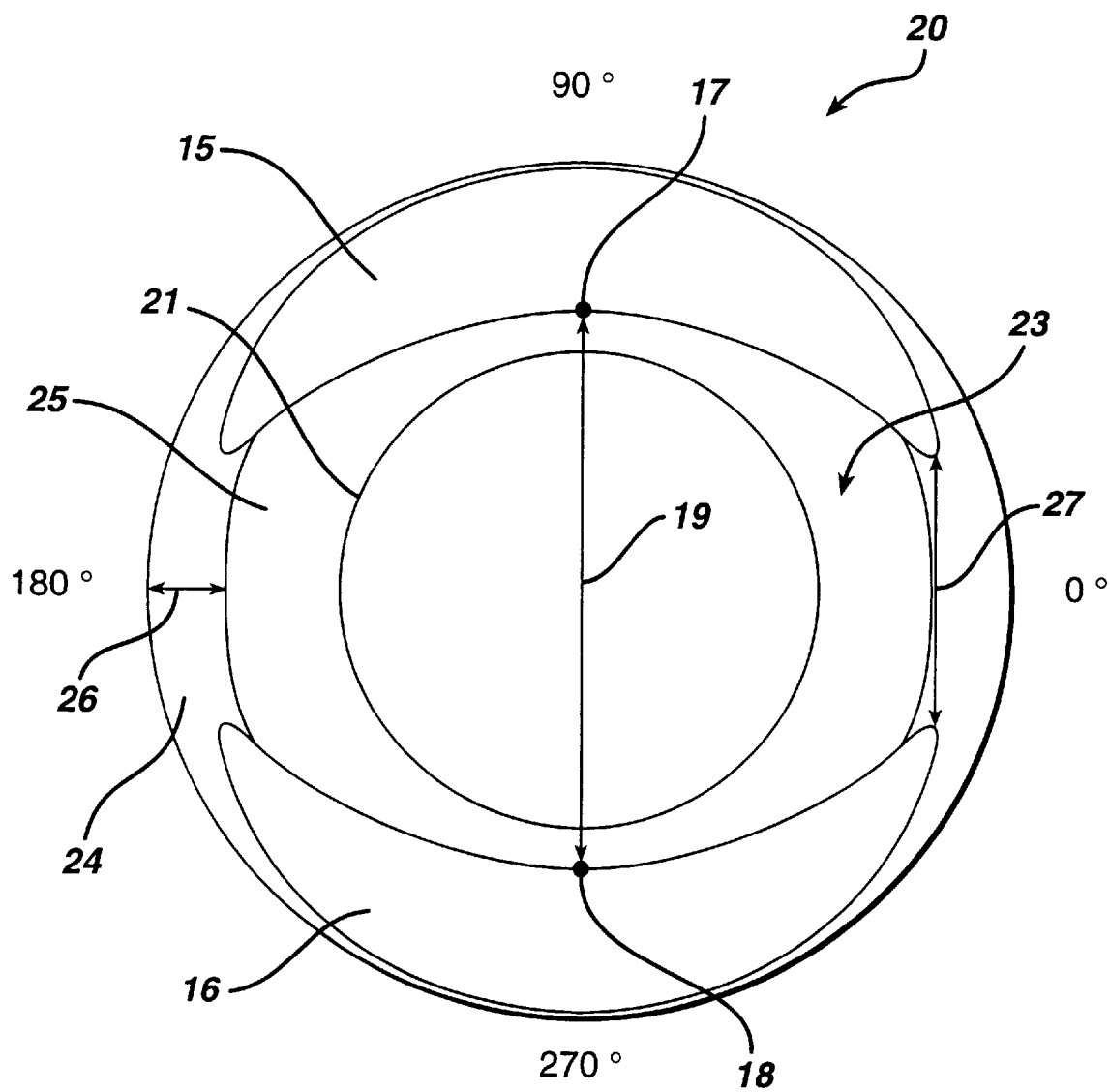
FIG. 3 depicts a magnified, plan view of a lens of the invention.

Referring now to FIG. 3, contact lens 20 of the invention is shown. Lens 20 has convex surface 23 and a concave surface, not shown, that sits on the wearer's cornea. Convex surface 23 has central optical zone 21 and non-optical lenticular zone 25 surrounding the central optical zone 21. Slab-off areas 15 and 16 are shown at the periphery of lens 20. The slab-off gap 27 between the slab-off areas and the slab-off central diameter 19 between center points 17 and 18 of slab-offs 15 and 16, respectively, are also shown.

Figure 2:
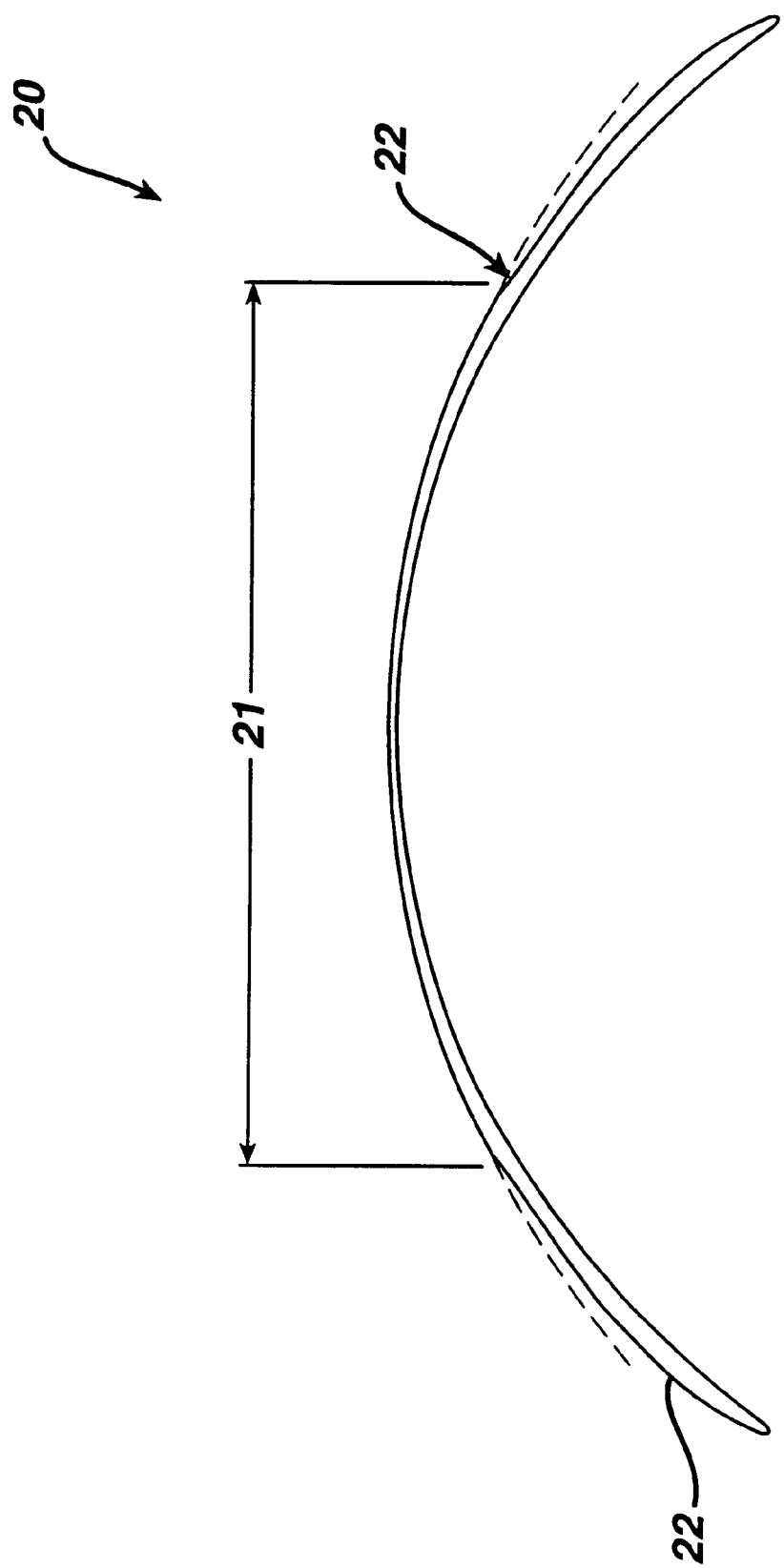
FIG. 2 depicts a magnified, cross-sectional view of a lens of the invention.
Figure 4:
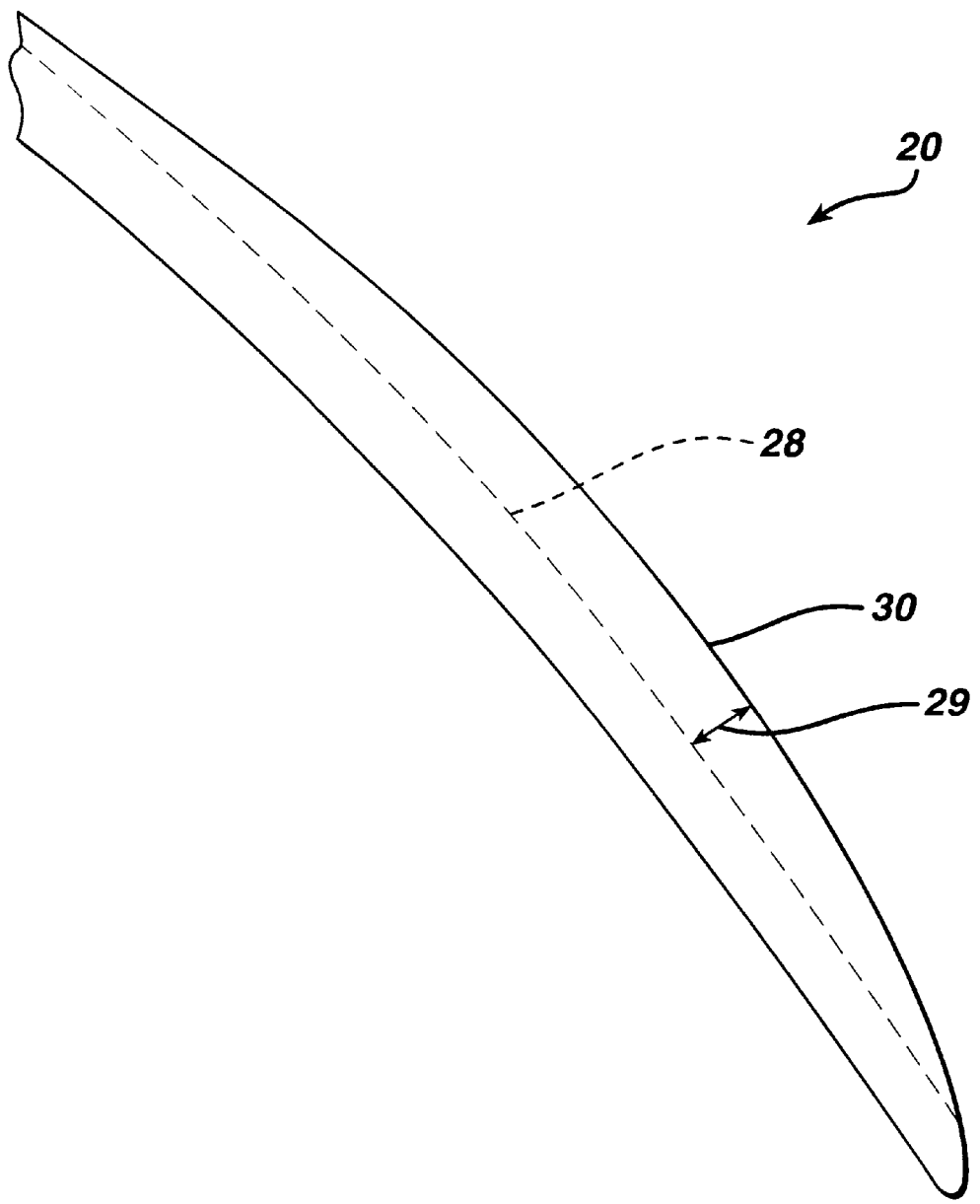
FIG. 4 depicts a magnified, cross-sectional view of a portion of a lens of the invention.

FIG. 4 is a magnified, cross-sectional view of a portion of an edge of lens 20. Solid line 30 is the lens edge at 180°. The dashed line 28 is an overlay of the edge at 90°. FIG. 2 illustrates the edge thickness differential 29 between the horizontal and vertical meridians of the lens.

Figure 1:
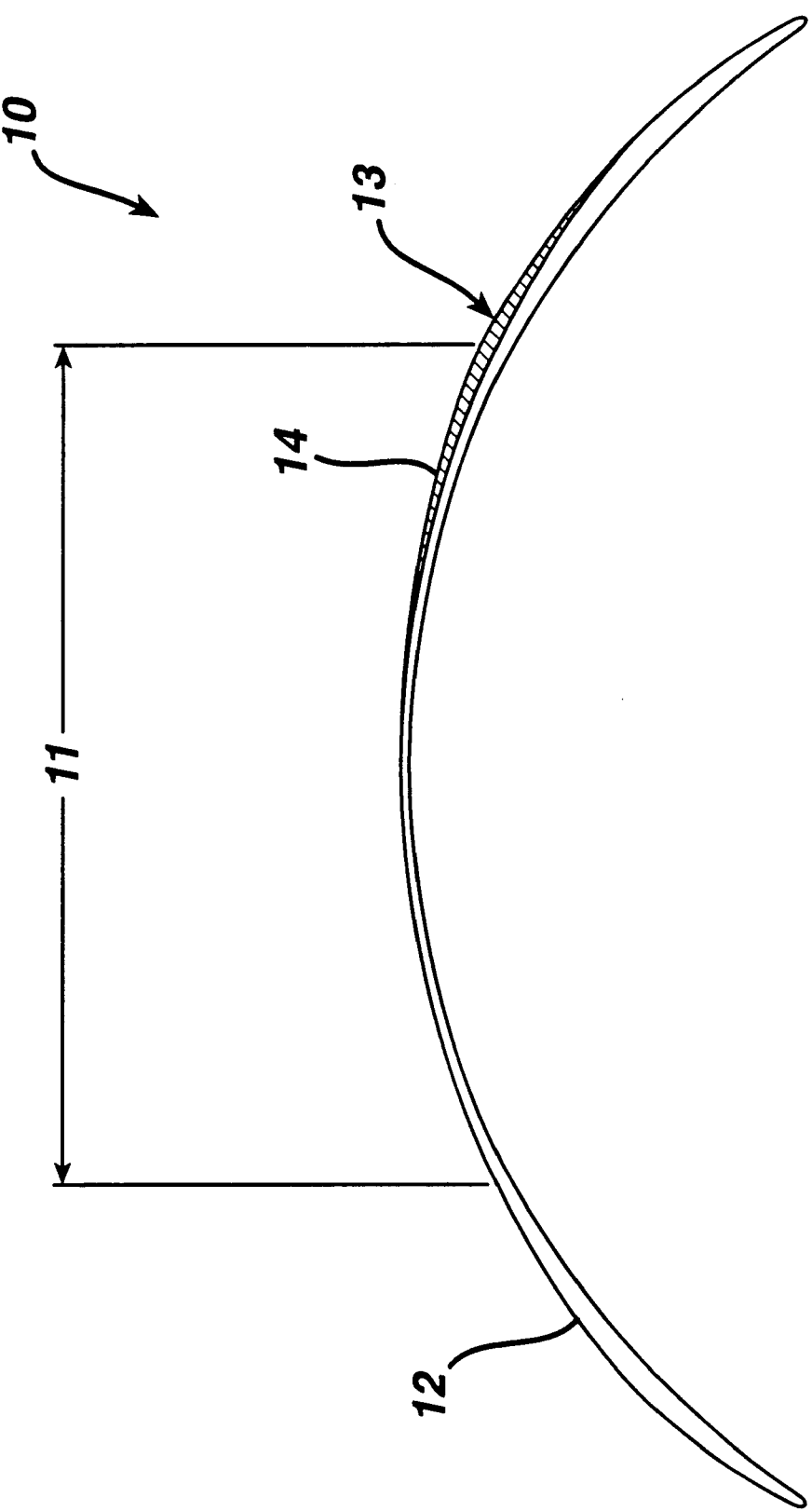
FIG. 1 depicts a magnified, cross-sectional view of a conventional lens.

It is a discovery of the invention that, although changes in optic zone design, meaning curvature and/or diameter produce only small changes in contact lens mass volume, changes in lens peripheral zone design, made to accommodate the changes in optic zone curvature, may result in marked changes in peripheral volume. For example, in FIG. 1 is depicted a conventional contact lens 10 in which optic zone 11 and peripheral zone 12 are shown. The shaded area of the lens depicts how a change in the radius of curvature of optic zone 11 affects the lens' periphery. An optic zone radius change is shown at 14 with an accompanying increase in peripheral lens volume mass at 13. This volume change may make fitting of the lens more difficult as a wearer' prescription changes. Additionally, the volume changes may negatively effect performance of the lens for the wearer.

In the method of the invention, the peripheral zone geometry of the lens is designed first and does not vary as changes are made to optic zone design. Specifically, the peripheral zone geometry is designed so that the convex surface has a slab-off gap of about 4.50 mm, an edge thickness differential of about 0.170 mm, a slab-off central diameter of about 8.00 mm or about 9.50 mm, and a bevel width of about 1.00 to about 1.50 mm. It is a discovery of the invention that the use of such peripheral zone design permits changes to be made to the optic zone curvature without changing the peripheral zone geometry. As shown in FIG. 2, the dotted line represents the lens periphery as it would need to be in a conventional lens to accommodate optic zone 21. However, the peripheral zone geometry of the invention permits implementation of optic zone 21 without an increase in the volume mass at lens periphery 22. In this way, consistency in fit and performance of the lenses with changes in prescription is achieved.

After the design of the peripheral geometry for the lens is complete, the range of optic zone designs desired for the two or more contact lenses is provided by calculating the lens center thickness, optic zone curvature and diameter. The optic zone design may be carried out by any known method. Optionally, in addition to the optic zone and peripheral zone, a transition zone may be provided, which zone may be useful to ensure that the optic zone intersection with the lens peripheral zone does not result in the formation of steps or ridges in the lens.

Contact lenses useful in the invention may be either hard or, preferably, soft lenses having cylinder correction, which lenses are made of any suitable material. Preferably, the soft contact lenses are made of hydrogel or silicone-containing hydrogel. Additionally, the lenses of the invention may have any of a variety of corrective optical characteristics incorporated onto the surfaces. For example, the lens may have any one or more of spheric, aspheric, bifocal, multifocal, toric or prismatic corrections. These corrections may be on either or both the convex or concave surface.

What is claimed is:

1. A method for manufacturing contact lenses comprising the steps of: a.) providing a peripheral zone geometry for the contact lenses comprising slab-offs and, a slab-off gap of about 4.50 mm, an edge thickness differential of about 0.170 mm, a slab-off central diameter of about 8.00 or about 9.50 mm, and a bevel having a bevel width of about 1.00 to about 1.50 mm; and b.) providing subsequently two or more optic zone designs for the contact lens, wherein the peripheral zone geometry remains substantially constant.

2. The method of claim 1, wherein the slab-off central diameter is about 8.00 mm.

3. The method of claim 1, wherein the slab-off central diameter is about 9.50 mm.

4. A contact lens having a toric correction and a positive spherical correction comprising a convex outer surface, a concave inner surface, the convex surface comprising slab-offs and a slab-off gap of about 4.50 mm, an edge thickness differential of about 0.170 mm, a slab-off central diameter of about 8.00 mm, and a bevel having a bevel width of about 1.00 to about 1.50 mm.

5. A contact lens having a toric correction and a minus spherical correction comprising a convex outer surface, a concave inner surface, the convex surface comprising slab-offs and a slab-off gap of about 4.50 mm, an edge thickness differential of about 0.170 mm, a slab-off central diameter of about 9.50 mm, and a bevel having a bevel width of about 1.00 to about 1.50 mm.

* * * * *